(12) United States Patent
Blum

(10) Patent No.: US 9,884,650 B2
(45) Date of Patent: Feb. 6, 2018

(54) VEHICLE BODY STRUCTURE

(71) Applicant: Volkswagen Aktiengesellschaft, Wolfsburg (DE)

(72) Inventor: Oliver Blum, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/044,650

(22) Filed: Feb. 16, 2016

(65) Prior Publication Data
US 2016/0244101 A1    Aug. 25, 2016

(30) Foreign Application Priority Data

Feb. 24, 2015  (DE) ........................ 10 2015 203 309

(51) Int. Cl.
*B62D 25/00*  (2006.01)
*B62D 25/02*  (2006.01)

(52) U.S. Cl.
CPC ................... *B62D 25/025* (2013.01)

(58) Field of Classification Search
CPC .................................................. B62D 25/025
USPC ....... 296/209, 187.02, 29, 30; 280/797, 798; 411/547, 546
See application file for complete search history.

(56) References Cited

U.S. PATENT DOCUMENTS

| 2,223,335 | A | * | 11/1940 | Stewart | ..................... B64C 3/48 244/217 |
| 5,224,574 | A | * | 7/1993 | Thum | ..................... F16F 7/123 188/371 |
| 6,237,304 | B1 | * | 5/2001 | Wycech | ............... B62D 29/002 29/530 |
| 6,406,088 | B1 | * | 6/2002 | Tate | ..................... B62D 21/152 188/371 |

(Continued)

FOREIGN PATENT DOCUMENTS

| CN | 101801767 A | 8/2010 |
| DE | 380 7417 A1 | 9/1989 |

(Continued)

OTHER PUBLICATIONS

Search Report for German Patent Application No. 10 2015 203 309.0, dated Nov. 4, 2015.
Office Action for Chinese Patent Application No. 201610037488.4, dated Oct. 10, 2017.

*Primary Examiner* — Dennis H Pedder
(74) *Attorney, Agent, or Firm* — Pearl Cohen Zedek Latzer Baratz LLP

(57) ABSTRACT

The invention relates to a vehicle body structure, with at least one hollow profile beam (1) that extends in the direction (x) of the lengthwise extension and with a hollow profile (7) whose height ($\Delta z_1$; $\Delta z_2$) between two opposite profile walls (17) varies along the direction (x) of the lengthwise extension, and in this hollow profile (7) at least one dividing element (23) is arranged in order to reinforce the hollow profile beam (1) in a crosswise direction (y). According to the invention, the dividing element (23) consists of two separate sheet metal parts (33, 35) which are each firmly attached to the opposite profile walls (17) and which are firmly joined together at a shared connection point (A).

18 Claims, 4 Drawing Sheets

(56) References Cited

U.S. PATENT DOCUMENTS

| | | | | |
|---|---|---|---|---|
| 8,308,227 B2 * | 11/2012 | Tsuruta | ............... | B62D 21/157 |
| | | | | 296/209 |
| 2004/0012230 A1 * | 1/2004 | Burge | ............... | B62D 25/2036 |
| | | | | 296/209 |
| 2006/0103168 A1 * | 5/2006 | Ueno | ............... | B21D 26/045 |
| | | | | 296/187.02 |
| 2013/0241233 A1 * | 9/2013 | Ohnaka | ............... | B62D 21/152 |
| | | | | 296/187.1 |

FOREIGN PATENT DOCUMENTS

| | | |
|---|---|---|
| DE | 410 2944 A1 | 8/1992 |
| DE | 195 28874 A1 | 2/1997 |
| DE | 196 18050 A1 | 4/1997 |
| DE | 196 22675 A1 | 12/1997 |
| DE | 103 04 307 B4 | 8/2004 |
| DE | 10 2005 011 319 A1 | 9/2006 |
| DE | 10 2006 016 607 A1 | 10/2007 |
| DE | 10 2007 017 165 A1 | 10/2008 |
| DE | 10 2007 032 245 A1 | 1/2009 |
| DE | 10 2008 062 007 A1 | 6/2010 |
| DE | 10 2012 015 938 A1 | 2/2013 |
| EP | 0331945 * | 2/1989 |
| EP | 0331945 | 9/1989 |
| EP | 1445177 | 8/2004 |
| EP | 1980471 | 10/2008 |
| JP | 2008 189 233 A2 | 8/2008 |

* cited by examiner

SECTION I-I

VEHICLE BODY STRUCTURE

This application claims priority from German Patent Application No. 10 2015 203 309.0, filed Feb. 24, 2015, which is incorporated herein by reference.

FIELD OF THE INVENTION

The invention relates to a vehicle body structure.

BACKGROUND OF THE INVENTION

A vehicle body structure for a two-track vehicle usually has side door sills which extend as hollow profile beams in the lengthwise direction of the vehicle and which delimit the bottom of a front door opening and of the rear door opening.

A generic vehicle body structure generally refers to a hollow profile beam configured, for instance, as a door sill with a hollow profile whose height between two opposite profile walls is reduced in the area of the rear door opening while the door-entry area is enlarged. For reinforcement purposes, it is common practice for such a hollow profile to have dividing elements in the crosswise direction that are at a distance from each other in the direction of the lengthwise extension of the hollow profile beam. Since the profile height varies in the direction of the lengthwise extension, it is necessary to stock a large number of different dividing elements that match the geometry of the appertaining profile height of the door sill, which is complicated in terms of assembly and production.

German patent application DE 10 2007 017 165 A1 discloses a door sill that is configured as a hollow profile beam and that—as seen in the vehicle crosswise direction—consists of a profile part on the inside and a profile part on the outside of the vehicle that are joined together at upper and lower flange connections. For purposes of increasing the crosswise stiffness of the door sill in case of a side impact, sheet metal reinforcement parts are provided that bridge the hollow space of the door sill.

SUMMARY OF THE INVENTION

The objective of the invention is to put forward a vehicle body structure in which a hollow profile beam can be provided whose profile height can be varied in the direction of the lengthwise extension, in a manner that is technically easy to assemble and to produce.

This objective is achieved by the features of the independent claims. Preferred refinements of the invention are disclosed in the subordinate claims.

The invention is based on the fact that, in the generic state of the art, geometrically different dividing elements have to be kept in stock due to the varying profile height in the direction of the lengthwise extension. Before this backdrop, according to the characterizing part of claim 1, the dividing element is no longer configured in one piece or made of a single material, for instance, a sheet metal shaped part, but rather, it consists of two separate sheet metal parts. Each of these sheet metal parts is attached (for example, welded) to the opposite profile walls of the hollow profile beam. Moreover, the two sheet metal parts are firmly joined together (preferably welded) at a shared connection point. In the case of such a two-part dividing element, the assembly in the hollow profile beam can be carried out as follows: first of all, the two sheet metal parts are affixed independently of each other to the opposite profile walls and then first placed together in loose contact with each other at a shared connection point. Subsequently, the two sheet metal parts are firmly joined together (for example, by means of spot welding) at the shared connection point. Therefore, depending on the profile height at the installation site, the two sheet metal parts can overlap each other while the height variation is compensated for by a different overlapping amount so that the profile height variation can be compensated for.

In one technical implementation, the two sheet metal parts each have contact surfaces at the connection point and these contact surfaces overlap each other by a given overlapping amount and are firmly joined together. As already indicated above, during the assembly of the dividing element, the excess can be adjusted as a function of the profile height that varies in the direction of the lengthwise extension.

In this manner, a plurality of identical dividing elements can be installed in the hollow profile beam, whereby these elements are at a distance from each other in the direction of the lengthwise extension and, in order to match the appertaining profile height, their sheet metal parts are joined together with different overlapping amounts at the appertaining shared connection points.

In a particularly preferred embodiment variant, the hollow profile beam is a door sill which extends in the lengthwise direction of the vehicle and which delimits the bottom of a front door opening and of the rear door opening. Its profile height can be reduced in the area of the rear door opening while, at the same time, the door-entry area is enlarged.

In one technical implementation, the cross section of the hollow profile can be closed, that is to say, it can be delimited by the profile walls that are opposite from each other in the vertical direction of the profile as well as by the profile walls that are opposite from each other in the crosswise direction. The dividing element can be, for instance, a sheet metal shaped part having a crosswise wall with a large surface area which covers the hollow profile, and it can be configured with edge flanges that are bent upwards from it and that are attached to the appertaining profile walls (for example, by welding). In a preferred structural design, both sheet metal parts of the dividing element have edge flanges that are opposite from each other in the crosswise direction. As seen in the longitudinal direction, these sheet metal parts can project in opposite directions from the crosswise wall of the dividing element. Moreover, in the vertical direction of the profile, the two sheet metal parts can have edge flanges that are opposite from each other and can project from the crosswise wall of the dividing element in the direction of the lengthwise extension, not in the opposite direction, but rather in the same direction.

As mentioned above, when the dividing elements are in their installed position, the two sheet metal parts are joined together at the connection point by means of their appertaining contact surfaces. With an eye towards achieving greater connection strength between the two sheet metal parts, these contact surfaces are preferably configured with an adapted contour and a large surface area. In one embodiment variant, the contact surfaces of the sheet metal parts can be configured on the wall sections of the sheet metal parts that form the crosswise wall of the dividing element as well as on the edge flanges of the two sheet metal parts that are opposite from each other in the crosswise direction. This results in a preferred Z-shaped guide contour that serves to push the two sheet metal parts against each other in the vertical direction of the profile during the assembly procedure.

In one technical implementation, the door sill configured as a hollow profile beam can consist of two sheet metal shell parts that are firmly joined together at angled edge flanges so as to form a closed hollow profile. The cross section of the sheet metal shell part on the inside of the vehicle can be U-shaped with a profile base as well as with side flanks that are bent upwards from it. The two side flanks can form the above-mentioned profile walls that are opposite from each other in the vertical direction of the profile. The profile base, in contrast, can form one of the opposite profile walls in the crosswise direction. The other, remaining profile wall, in contrast, is formed by the sheet metal shell part on the outside of the vehicle.

The advantageous embodiments and/or refinements of the invention explained above and/or cited in the subordinate claims can be employed on their own as well as in any desired combination with each other, except, for example, in cases where there are clear dependencies or incompatible alternatives.

BRIEF DESCRIPTION OF THE DRAWINGS

The invention and its advantageous embodiments and/or refinements as well as their advantages will be explained in greater detail below on the basis of drawings.

The following is shown.

DETAILED DESCRIPTION OF THE INVENTION

Figure 1:
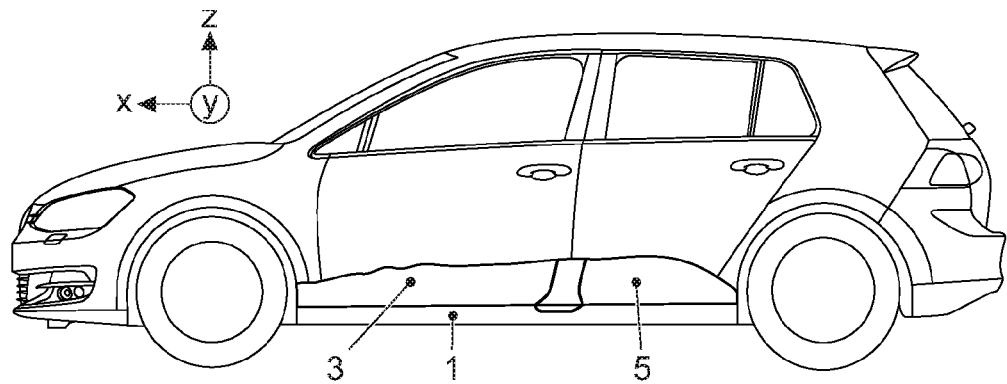
FIG. 1 a side view of a two-track vehicle in a partial front view.
Figure 2:
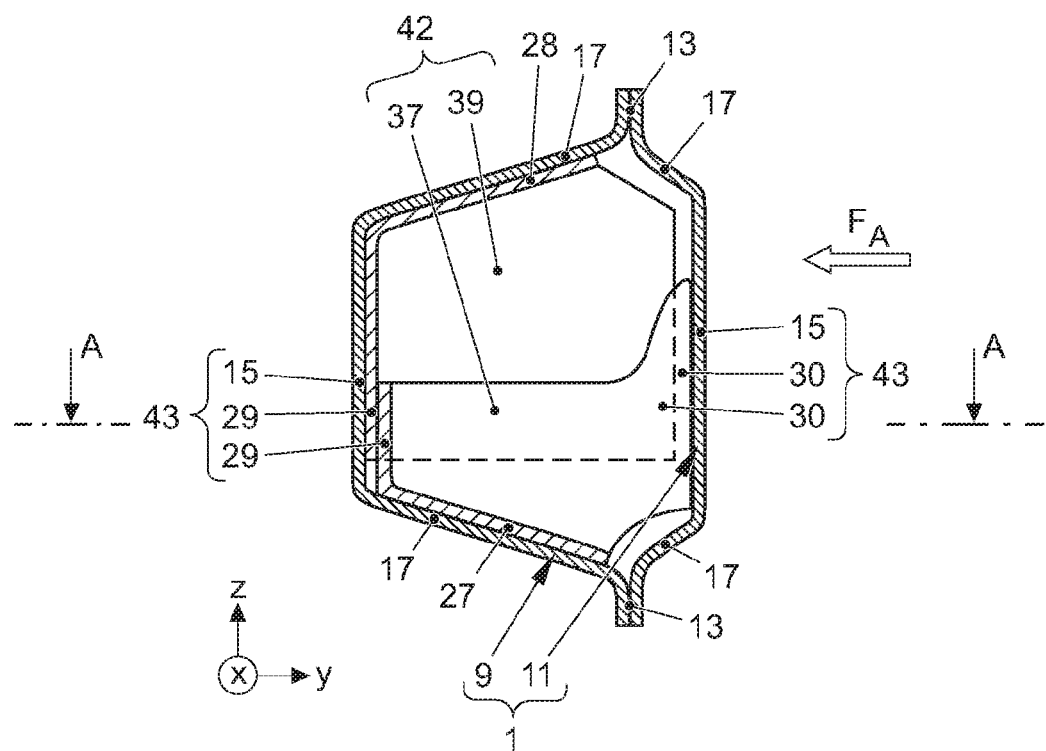
FIG. 2 a partial sectional view along the cutting plane I-I from FIG. 1.
Figure 3:
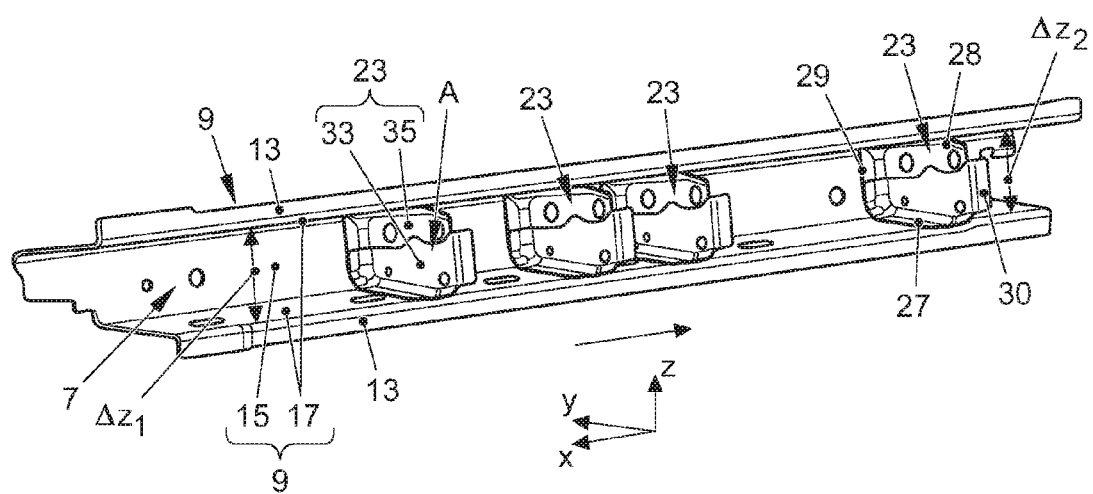
FIG. 3 a perspective view of a sheet metal shell part on the inside of the vehicle, with dividing elements installed therein.
Figure 4:
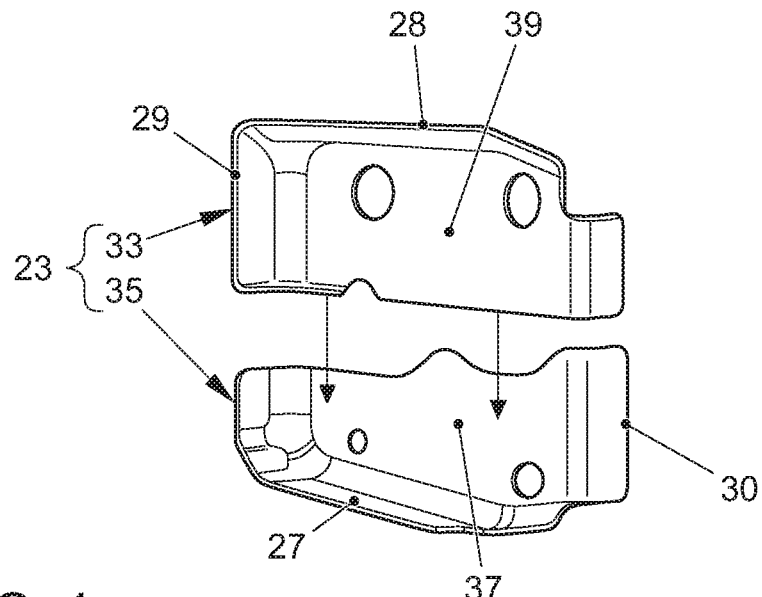
FIGS. 4 and 5 one of the dividing elements in different assembly stages; as well as FIG. 6 a partial sectional view along the cutting plane A-A from FIG. 2.
Figure 6:
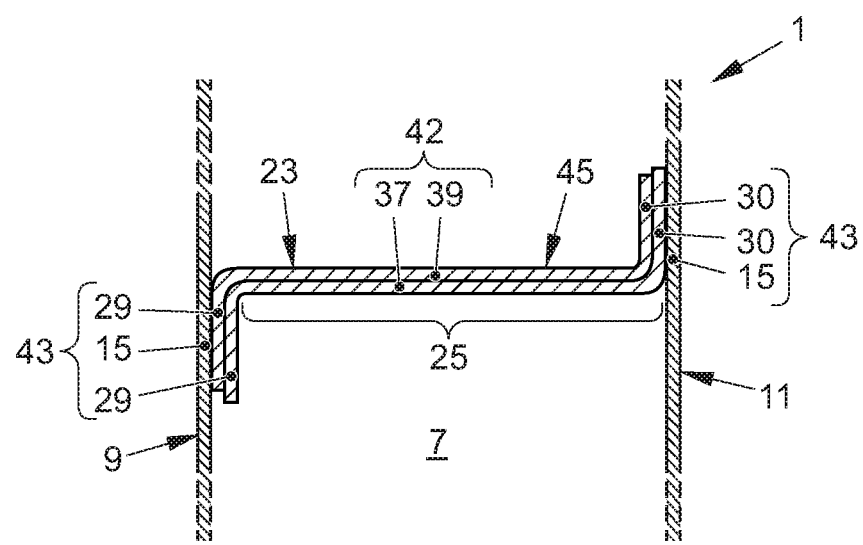

FIG. 1 shows a side view of a two-track vehicle whose body framework structure has side door sills 1 extending in the lengthwise direction x of the vehicle. The door sill 1 shown in FIG. 1 delimits the bottom of a front door opening 3 as well as of an adjoining rear door opening 5. The door sill 1 is configured as a hollow profile beam with a closed hollow profile 7 (FIGS. 3 and 6). According to FIG. 2, it has two sheet metal shell parts 9, 11 that are welded together onto edge flanges 13 that are angled outwards, thus forming the closed hollow profile 7. As can be seen in FIG. 2 or FIG. 3, the cross section of the sheet metal shell part 9 on the inside of the vehicle is U-shaped and configured with a profile base 15 as well as with side flanges 17 that are bent upwards from it.

By the same token, the sheet metal shell part 11 on the inside of the vehicle is also U-shaped, although it is configured so as to be altogether flatter, and it likewise has a profile base 15 as well as side flanges 17 that project away from it.

The appertaining profile base 15 of the sheet metal shell parts 9, 11 of the door sill 1 forms a profile wall that laterally delimits the hollow profile 7. The two side flanges 17 of the sheet metal shell parts 9, 11 are a distance from each other in the vertical direction z of the vehicle over a profile height Δz and they likewise form profile walls that delimit the hollow profile 7. According to FIG. 3, as seen in the lengthwise direction x of the vehicle, the profile height Δz of the door sill 1 is not constant throughout, but rather it diminishes slightly in the lengthwise direction x of the vehicle, for instance, by 2 cm to 3 cm. As a result, the door entry area in the rear door opening 5 is enlarged, thus making it more convenient to access. Moreover, a total of four dividing elements 23 are installed in the door sill 1 in order to reinforce the door sill 1. Each of these dividing elements 23 has a crosswise wall 25 that covers the hollow profile 7 as well as edge flanges 27 to 30 that are at an angle to it, said flanges being firmly welded to the opposite profile walls 17 (that is to say, the side flanges) in the vertical direction z of the vehicle as well as to the opposite profile walls 15 (that is to say, the appertaining profile base) in the crosswise direction y of the vehicle.

Figure 5:
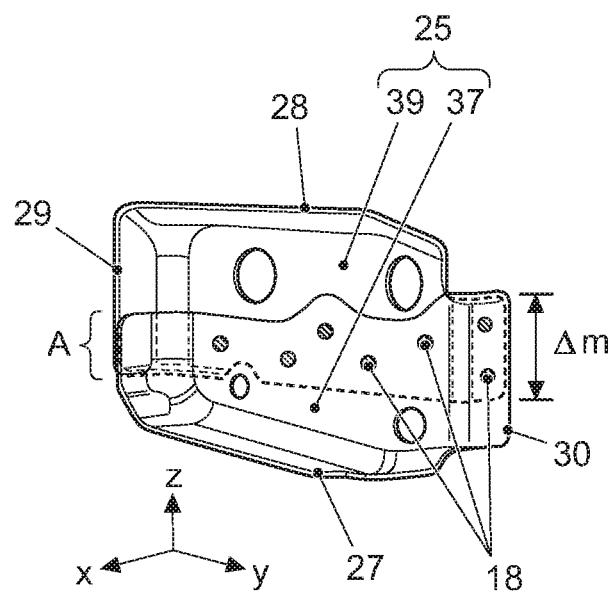

The total of four installed dividing elements 23 shown in FIG. 3 are kept in stock as identical parts, even though their profile height Δz varies in the lengthwise direction x of the vehicle. For this purpose, each dividing element 23 is configured in two parts, namely, two separate sheet metal parts 33, 35. In their installed position (FIG. 5), the two sheet metal parts 33, 35 are each welded at their upper and lower edge flanges 27, 28 to the profile walls 17 that are opposite from them in the vertical direction z. Moreover, the two sheet metal parts 33, 35 are welded together at a shared connection point A. At the connection point A, the contact surfaces of two sheet metal parts 33, 35 overlap each other by an overlapping amount Δm and are firmly joined together, for instance, by spot-welding points 18 (FIG. 5). When the dividing elements 23 that differ in the lengthwise direction x of the vehicle are being assembled at the installation places, the overlapping amount Δm of the two contact surfaces of the sheet metal parts 33, 35 is adjusted by the technician as a function of the varying profile height $\Delta z_1$; $\Delta z_2$.

Each of the two sheet metal parts 33, 35 has wall sections 37, 39 which, in their installed position, form the crosswise wall 25 of the dividing element. The contact surfaces provided at the connection point A are not formed only on the wall sections 37, 39 of the two sheet metal parts 33, 35, but rather also on the edge flanges 29, 30 of the two sheet metal parts 33, 35 that are opposite from each other in the crosswise direction y. This results in a Z-shaped contact contour 45 that can be seen in FIG. 6, by means of which the height positioning of the two sheet metal parts 33, 35 can be achieved in a manner that is conducive for the assembly.

When the door sill 1 is being assembled, the total of four identically configured dividing elements 23 are each pre-positioned in the sheet metal shell part 9 on the inside of the vehicle in the correct position in the lengthwise direction x of the vehicle and then affixed at their upper and lower edge flanges 27, 28 to the appertaining upper and lower profile walls 17, and their contact surfaces are placed in loose contact with each other. Subsequently, in a second process step, the two sheet metal parts 33, 35 of the appertaining dividing element 23 are spot-welded together at their contact surfaces. In a third process step, the sheet metal shell part 11 on the outside of the vehicle is then placed onto the edge flange 13 of the sheet metal shell part 9 on the inside of the vehicle and welded thereto. At the same time, the edge flange 30 of the appertaining dividing element 23 on the outside of the vehicle is also welded to the sheet metal shell part 11 on the outside of the vehicle.

As can be seen in FIG. 2 or 6, the wall sections 37, 39 of the sheet metal parts 33, 35 that are in contact with each other form a double-walled structure 42. The edge flanges 29, 30 of the two sheet metal parts 33, 35 that are opposite from each other in the crosswise direction y likewise form a double-walled structure 42. When the double-walled edge flanges 29, 30 that are opposite from each other in the crosswise direction y are welded, this yields a component-stiff three-layered structure 43 (FIGS. 2 and 6) which, together with the double-walled structure 42, forms an extremely stiff component when subjected to side-impact forces $F_A$.

The invention claimed is:

1. A vehicle body structure, comprising:
at least one door sill that extends in a lengthwise direction of a vehicle, each of the at least one door sill having a hollow profile whose height between two opposite profile walls varies along the lengthwise direction, wherein:
at least one dividing element is arranged in the hollow profile in order to reinforce the at least one door sill in a crosswise direction,
the hollow profile is delimited by the profile walls that are opposite from each other in a vertical direction of the profile as well as by two profile walls that are opposite from each other in the crosswise direction,
the at least one dividing element has a crosswise wall which covers the hollow profile and which as edge flanges that are at an angle to it, and
each of the at least one dividing element consists of two separate sheet metal parts which are each firmly attached to the opposite profile walls and which are firmly joined together at a shared connection point.

2. The vehicle body structure according to claim 1,
wherein the two sheet metal parts have contact surfaces at the shared connection point and these contact surfaces overlap each other by a given overlapping amount and are firmly joined together, and
wherein, during the assembly of the at least one dividing element, the given overlapping amount can be adjusted as a function of the profile height that varies in the lengthwise direction.

3. The vehicle body structure according to claim 2,
wherein a plurality of identical dividing elements are installed in the at least one door sill, whereby the dividing elements are at a distance from each other in the lengthwise direction, and
wherein, in order to match the profile height that varies in the lengthwise direction, the sheet metal parts of the dividing elements are joined together with different overlapping amounts at the appertaining shared connection points.

4. The vehicle body structure according to claim 1, wherein the door sill delimits the bottom of a front door opening as well as of a rear door opening, and its profile height is reduced in the area of the rear door opening while, at the same time, the door-entry area is enlarged.

5. The vehicle body structure according to claim 1, wherein the two sheet metal parts of the dividing element have edge flanges that are opposite from each other in the crosswise direction and that are angled away from the crosswise wall of the dividing element.

6. The vehicle body structure according to claim 1, wherein the two sheet metal parts of the dividing element each have edge flanges that are opposite from each other in the vertical direction of the profile and that are angled away from the crosswise wall of the dividing element in a same direction as the lengthwise direction.

7. The vehicle body structure according to claim 6, wherein:
the two sheet metal parts have contact surfaces at the shared connection point and these contact surfaces overlap each other by a given overlapping amount and are firmly joined together,
the contact surfaces of the two sheet metal parts form a double-walled structure, and
the contact surfaces are formed on the wall sections of the sheet metal parts that form a crosswise wall of the dividing element as well as on the edge flanges of the two sheet metal parts that are opposite from each other in the crosswise direction.

8. The vehicle body structure according to claim 7,
wherein the edge flanges that are opposite from each other in the crosswise direction as well as the sheet-metal wall sections that are in contact with each other form a double-walled structure, and
wherein the edge flanges are joined so as to form a three-layered structure together with the profile walls of the at least one door sill.

9. A vehicle body structure, comprising:
at least one door sill that extends in a lengthwise direction of a vehicle, each of the at least one door sill having a hollow profile whose height between two opposite profile walls varies along the lengthwise direction, wherein:
at least one dividing element is arranged in the hollow profile in order to reinforce the at least one door sill in a crosswise direction, wherein the at least one dividing element has a crosswise wall which covers the hollow profile
the hollow profile is delimited by the profile walls that are opposite from each other in a vertical direction of the profile, and
each of the at least one dividing element consists of two separate sheet metal parts which are each firmly attached to the opposite profile walls and which are firmly joined together at a shared connection point;
wherein the door sill delimits the bottom of a front door opening as well as of a rear door opening, and its profile height is reduced in the area of the rear door opening while, at the same time, the door-entry area is enlarged;
wherein the at least one door sill consists of two sheet metal shell parts that are firmly joined together at angled edge flanges so as to form the closed hollow profile, and
wherein the cross section of the sheet metal shell part on the inside of the vehicle is U-shaped with a profile base as well as with side flanges that are bent away from it, and
wherein the two side flanges form the profile walls that are opposite from each other in a vertical direction of the profile, and the profile base forms one of the profile walls that are opposite from each other in the crosswise direction.

10. A vehicle body structure, comprising:
at least one hollow profile beam that extends in a lengthwise direction of a vehicle, wherein:
each of the at least one hollow profile beam has a hollow profile whose height between two opposite profile walls varies along the lengthwise direction, wherein in this hollow profile at least one dividing element is arranged in order to reinforce the at least one hollow profile beam in a crosswise direction;
each of the at least one dividing element consists of two separate sheet metal parts which are each firmly attached to the opposite profile walls and which are firmly joined together at a shared connection point;

the two sheet metal parts have contact surfaces at the shared connection point and these contact surfaces overlap each other by a given overlapping amount and are firmly joined together; and during the assembly of the at least one dividing element, the given overlapping amount can be adjusted as a function of the profile height that varies in the direction of the lengthwise extension.

11. The vehicle body structure according to claim 10, wherein a plurality of identical dividing elements are installed in the at least hollow profile beam, whereby the dividing elements are at a distance from each other in the lengthwise direction, and wherein, in order to match the profile height that varies in the lengthwise direction, the sheet metal parts of the dividing elements are joined together with different overlapping amounts at the appertaining shared connection points.

12. The vehicle body structure according to claim 10, wherein the hollow profile beam is a door sill that extends in the lengthwise direction and that delimits the bottom of a front door opening as well as of a rear door opening, and its profile height is reduced in the area of the rear door opening while, at the same time, the door-entry area is enlarged.

13. The vehicle body structure according to claim 10, wherein at least one of:

the hollow profile is delimited by the profile walls that are opposite from each other in a vertical direction of the profile as well as by two profile walls that are opposite from each other in the crosswise direction; and the at least one dividing element has a crosswise wall which covers the hollow profile and which has edge flanges that are at an angle to it.

14. The vehicle body structure according to claim 13, wherein the two sheet metal parts of the dividing element have edge flanges that are opposite from each other in the crosswise direction and that are angled away from the crosswise wall of the dividing element.

15. The vehicle body structure according to claim 13, wherein the two sheet metal parts of the dividing element each have edge flanges that are opposite from each other in the vertical direction of the profile and that are angled away from the crosswise wall of the dividing element in a same direction as the lengthwise direction.

16. The vehicle body structure according to claim 10, wherein at least one of:

the contact surfaces of the two sheet metal parts form a double-walled structure, and the contact surfaces are formed on the wall sections of the sheet metal parts that form a crosswise wall of the dividing element as well as on the edge flanges of the two sheet metal parts that are opposite from each other in the crosswise direction.

17. The vehicle body structure according to claim 16, wherein the edge flanges that are opposite from each other in the crosswise direction as well as the sheet-metal wall sections that are in contact with each other form a double-walled structure, and wherein the edge flanges are joined so as to form a three-layered structure together with the profile walls of the at least hollow profile beam.

18. The vehicle body structure according to claim 13, wherein the hollow profile beam consists of two sheet metal shell parts that are firmly joined together at angled edge flanges so as to form the closed hollow profile, and wherein the cross section of the sheet metal shell part on the inside of the vehicle is U-shaped with a profile base as well as with side flanges that are bent away from it, and wherein the two side flanges form the profile walls that are opposite from each other in a vertical direction of the profile, and the profile base forms one of the two profile walls that are opposite from each other in the crosswise direction.

* * * * *